(12) United States Patent
Eckert et al.

(10) Patent No.: US 8,897,985 B2
(45) Date of Patent: Nov. 25, 2014

(54) METHOD AND EBS CONTROL UNIT FOR CONTROLLING BRAKE-APPLICATION ENERGY OF A VEHICLE COMBINATION

(71) Applicant: WABCO GmbH, Hannover (DE)

(72) Inventors: Horst Eckert, Rehburg-Loccum (DE); Arnd Gaulke, Wennigsen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/104,215

(22) Filed: Dec. 12, 2013

(65) Prior Publication Data

US 2014/0180553 A1    Jun. 26, 2014

(30) Foreign Application Priority Data

Dec. 20, 2012  (DE) .......................... 10 2012 024 982

(51) Int. Cl.

| | |
|---|---|
| *G06F 7/70* | (2006.01) |
| *G06F 19/00* | (2011.01) |
| *G06G 7/00* | (2006.01) |
| *G06G 7/76* | (2006.01) |
| *B60T 8/18* | (2006.01) |
| *B60T 8/17* | (2006.01) |
| *B60T 8/1766* | (2006.01) |
| *B60T 8/88* | (2006.01) |

(52) U.S. Cl.
CPC .............. *B60T 8/1887* (2013.01); *B60T 8/1708* (2013.01); *B60T 8/1766* (2013.01); *B60T 8/885* (2013.01); *B60T 2270/402* (2013.01)
USPC .......................................................... 701/70

(58) Field of Classification Search
CPC ..... B60T 8/1708; B60T 8/1887; B60T 8/885; B60T 8/1766
USPC .......................................................... 701/70
See application file for complete search history.

(56) References Cited

U.S. PATENT DOCUMENTS 7,134,733 B2   11/2006  Eckert et al.
8,267,485 B2    9/2012  Barlsen et al.

FOREIGN PATENT DOCUMENTS

DE         102 61 513       7/2004
DE     10 2008 022 026     11/2009

*Primary Examiner* — Maceeh Anwari
(74) *Attorney, Agent, or Firm* — Kramer Levin Naftalis & Frankel LLP (57) ABSTRACT

In a method for controlling the brake-application energy of a vehicle combination having a tractor vehicle equipped with an electronically controlled brake system, at least one front axle and a rear axle, and a trailer vehicle having at least one trailer axle, the functional capability of the electronically controlled brake system is monitored and a status signal is produced as a function thereof. A coupling force control factor is set as a function of the status signal such that, in the event of absent/impaired functional capability of the electronically controlled brake system, a minimal coupling force control factor is set, and the coupling force control factor is set greater than or equal to the minimal control factor, wherein the minimal control factor is not equal to zero and/or is selected such that ascertained separate brake-application energy levels for the tractor vehicle and the trailer vehicle are dependent on a brake-application energy reference value and on axle load distribution.

10 Claims, 6 Drawing Sheets

METHOD AND EBS CONTROL UNIT FOR CONTROLLING BRAKE-APPLICATION ENERGY OF A VEHICLE COMBINATION

CROSS-REFERENCE TO RELATED APPLICATION

This application claims the benefit of DE 10 2012 024 982.9 filed on Dec. 20, 2012, the disclosure of which is incorporated herein by reference in its entirety.

FIELD OF THE INVENTION

The present invention generally relates to a method for controlling the brake-application energy of a vehicle combination (especially, a semitrailer truck combination) including a tractor vehicle and a trailer vehicle, in which the tractor vehicle has an electronically controlled brake system (BBS) having an ABS function and, optionally, one or more driving stability control functions, and the trailer vehicle has at least one trailer axle.

BACKGROUND OF THE INVENTION

Applicant's DE 102 61 513 A1 (which corresponds to U.S. Pat. No. 7,134,733) describes a method of the general type under consideration in which a deceleration setpoint value is compared to a deceleration actual value and a current brake-application energy reference value Kappa is ascertained from this comparison. In general the driver command, which is derived from a brake pedal actuation of the driver, is taken as the deceleration setpoint value.

Furthermore, in general, the EBS of the tractor vehicle ascertains the axle load distribution ALD of the tractor vehicle from the differential slip control function DSC during braking from the rotational behavior of the front wheels and the rear wheels. ALD is the axle load distribution of the tractor vehicle front axle to the tractor vehicle rear axle and changes with the weight or the loading state of the tractor vehicle and therefore also with the loading state of the semitrailer truck combination.

Brake-application energy levels (also called setpoint pressure brake levels), which have the unit bar/g, ate then ascertained separately for the tractor vehicle and the trailer vehicle from the brake-application energy level reference value Kappa and/or the axle load distribution ALD of the tractor vehicle.

In determining these separate brake-application energy levels for the tractor vehicle and the trailer vehicle, characteristic maps are used, which illustrate the dependencies of the brake-application energy levels of the tractor vehicle and of the trailer vehicle on at least one of the following variables: brake-application energy reference value Kappa and axle load distribution ALD of the tractor vehicle. In particular, coupling force control factors (also called influencing factors or CFC factors) are set in this case, which establish to what extent control of the coupling force between the tractor vehicle and the trailer vehicle occurs.

Fundamentally, the method described in DE 102 61 513 A1 represents a coupling force control method (also called CFC). The coupling force control method ascertains separate brake-application energy levels for the tractor vehicle and for the trailer vehicle. The CFC factor can be set to a value between 0 and 1 or 0% and 100%, wherein setting to 0 or 0% represents one extreme of a coupling force control and setting to 1 or 100% represents the other extreme.

Setting the CFC factor to 0 or 0% results in a coupling force control in which the ascertained separate brake-application energy levels for the partial vehicles of the vehicle combination are only dependent on the brake-application energy reference value Kappa. Setting the CFC factor to 1 or 100% results in a coupling force control in which the ascertained brake-application energy levels of the partial vehicles are dependent on the brake-application energy reference value Kappa and on the axle load distribution ALD. If a CFC factor is set to be greater than 0 or 0% and less than 1 or 100%, a coupling force control is carried out that has components of both coupling force control variants.

If the CFC factor is set to 1 or 100%, the control target of the coupling force control thus selected is 100% equal adhesion or adhesion ratios of the wheels of the tractor vehicle to the roadway and the wheels of the trailer vehicle to the roadway and therefore a coupling force between the partial vehicles of the vehicle combination of zero. The control target of this coupling force control variant follows the specification that each partial vehicle of the vehicle combination has to brake itself.

If the CFC factor is set to 0 or 0%, the control target of the coupling force control thus selected is a more equalized temperature level of the brakes of the tractor vehicle and the brakes of the trailer vehicle and also a reduction of the absolute peak temperatures, which occur during braking, of individual brakes of the wheels of the partial vehicles of the vehicle combination and therefore, in turn, an absolute lesser and more equalized brake lining wear behavior of the brake linings of all brakes of the partial vehicles of the vehicle combination; while dispensing with a coupling force between the partial vehicles of zero.

In the case of setting the CFC factor to 1 or 100%, a control target of equal adhesion ratios between wheels and roadway of the tractor vehicle and the trailer vehicle is sought; the coupling force or the forces transmitted between the vehicles during braking are therefore to be minimal or equal to zero, or such a control is sought. This can result in a different amount of wear on the brake linings and the tires of the tractor vehicle and the trailer vehicle.

At a CFC factor of 0 or 0%, in the event of a loading change (mass change) of the vehicle combination, the change of the braking work to be performed, which is caused by the load change, is distributed approximately uniformly to both partial vehicles. A more equalized wear behavior of the brake linings and the vehicle tires is sought in fills case, wherein a coupling force between the partial vehicles not equal to zero is accepted, i.e., control no longer occurs maximally for equal adhesion ratios of wheels to roadway of the wheels of the tractor vehicle and of the trailer vehicle.

The coupling force control factor can therefore primarily be selected freely, and determines the ratio of the braking work shares to be performed during braking, which are to be provided by the tractor vehicle and the trailer vehicle.

Systems and methods of the general type under consideration also allow the use of trailer vehicles, in particular semitrailers of a semitrailer vehicle combination, that do not have separate automatic load-dependent brake force control (ALB). This brake force control or ALB or ALB function can therefore also be implemented by the BBS of the tractor vehicle. However, unstable driving states can occur in such systems if extreme CFC factors are used in urgent extreme situations.

SUMMARY OF THE INVENTION

Generally speaking, it is an object of the present invention to provide a method and BBS tractor vehicle control unit for controlling brake-application energy of a vehicle combination, which enable a reduction of critical driving states.

Critical driving situations can occur if a small coupling force control factor, i.e., a coupling force control designed with the tendency toward uniform wear of the brake linings of all brakes of the partial vehicles, has been selected and problems in the BBS of the tractor vehicle occur, such as, for example, a failure of the ABS of the tractor vehicle. In the event of a failure of the ABS in the tractor vehicle, worsened brake action and brake control can occur. Furthermore, since a small coupling force control factor is selected, a shifting force of the trailer vehicle on the tractor vehicle can therefore occur, and, during braking, the trailer presses the tractor vehicle forward. This can be problematic if the trailer is loaded more in its rear region than in the front. Such unfavorable loading can result in buckling of the coupling joint between tractor vehicle and trailer, i.e., the "kingpin" or the drawbar, or also a lateral breakaway of the trailer, which then can possibly laterally pass the semitrailer tractor. Buckling of the vehicle combination (jackknifing) can then occur.

A further critical case can be presented when a small CFC factor is parameterized and the trailer or the vehicle combination is loaded far to the front, i.e., at the height of the axles of the tractor vehicle, i.e., front-loaded. In this case, there is a latent danger of jackknifing, in particular during cornering and/or in the case of low adhesion ratios of wheels to roadway.

Such critical driving states can occur if a small CFC factor is set (parameterized) and either a heavily front-loaded or heavily rear-loaded and, therefore, non-harmonically distributed load is provided. Both situations—a front-loaded and rear-loaded trailer vehicle with small CFC factor—can therefore be problematic.

The inventive embodiments are based on the concept of restricting the selection of the coupling force control factor such that such critical states cannot occur. For this purpose, the functional state of the EBS of the tractor vehicle can be evaluated, and the coupling force control factor can be set to a minimum value as a function of this evaluation.

If the axle loads are known, an unfavorable loading of the trailer in its rear region or front region can be determined. However, according to embodiments of the present invention, a minimum value for the coupling force control factor in the event of failure of the EBS can generally already be established.

The loading situation is, at a given mass (total mass or total weight) of the vehicle combination, characterized by the variables: weight of the tractor vehicle (i.e., weight or total loading of the tractor vehicle as a sum of the axle loads of its front axle and rear axle) and axle load distribution ALD (i.e., distribution of the axle loads of the front axle and the rear axle of the tractor vehicle).

If a small coupling force control factor is provided, for example, zero, and the variable axle load distribution ALD indicates that the tractor vehicle is not fully loaded, an increasingly larger minimal coupling force control factor is requested as a function of the ALD. The minimum value of the CFC factor can therefore be set in a manner dependent on the loading situation. In particular, a high axle load of the front axle in relation to the rear axle in the case of a high total weight or total loading indicates an unfavorable loading in the rear region of the trailer, since the rear axle of the tractor vehicle at the trailer is not more heavily loaded in this situation. Correspondingly, a small axle load of the front axle in relation to the rear axle in the case of a small total weight or total loading indicates unfavorable loading in the front region of the trailer.

Advantageously, the inventive embodiments can be implemented with little additional effort; only a status signal is set for the EBS functional capability, which can be performed solely by software programming. As a function thereof, a minimum value for the coupling force control factor (CFC factor) is then optionally set. While unfavorable wear or asymmetrical wear of the linings of the brakes of the tractor vehicle in relation to the linings of the trailer vehicle can possibly occur, significantly greater driving stability is achieved with relatively little effort, without the coupling force regulation between trailer vehicle and tractor vehicle being precluded in other situations.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments on the basis of the accompanying drawings, in which.

LIST OF REFERENCE CHARACTERS 1 vehicle combination
2 tractor vehicle
3 trailer vehicle
4 BBS control unit
5 BBS system
10 ABS sensors (wheel speed sensors)
12 interface 14 external memory
15 characteristic maps
HA rear axle
VA front axle
AA1, AA2 first, second trailer axles of the trailer vehicle 3
ALD axle load distribution of the tractor vehicle 2
AL_ZVA axle load of the front axle of the tractor vehicle 2
AL_ZHA axle load of the rear axle of the tractor vehicle 2
CFC influence factor (coupling factor)
M total weight of the vehicle combination 2
M_AFZ weight of the tractor vehicle 2
M_ZFZ weight of the trailer vehicle 3
z_Soll vehicle deceleration setpoint value
P-Soll-A brake pressure setpoint value (setpoint pressure)
P-Soll_Z brake pressure setpoint value (setpoint pressure)
BDN_A brake-application energy level
BDN_Z brake-application energy level
S1 setpoint deceleration signal
S2 brake control signals
S3 brake control signals to brakes of rear axle HA
S4 brake control signal to brakes of first trailer axle AA1
S5 brake control signal to brakes of second trailer axle AA2
S6 wheel speed signals
S7 status signal
St0-St3 method steps
J1-J5 method steps
N1-N6 method steps

DETAILED DESCRIPTION OF THE PREFERRED EMBODIMENTS

FIGS. 1(a) to 1(i) show, in each case, a vehicle combination 1 having a tractor vehicle 2 and a trailer vehicle 3. In the embodiments shown, the vehicle combination is a semitrailer truck 1; correspondingly, the tractor vehicle is a semitrailer tractor 2 and the trailer vehicle is a trailer 3. A coupling point between the partial vehicles 2, 3 lies in the region of the rear axle HA of the tractor vehicle 2, for example.

The following are ascertained as variables:
BDN_Z is the brake-application energy level (brake pressure level) of the tractor vehicle 2;
BDN_A is the brake-application energy level (brake pressure level) of the trailer vehicle 3;
Kappa is the brake-application energy reference value, an adaptation variable of the deceleration control;
ALD is the axle load distribution of the axle load of the front axle in relation to axle load of the rear axle of the tractor vehicle 2; and
M is the mass (total mass, total weight) of the vehicle combination 1, an adaptation variable of the differential slip control of the EBS.

Figure 1:
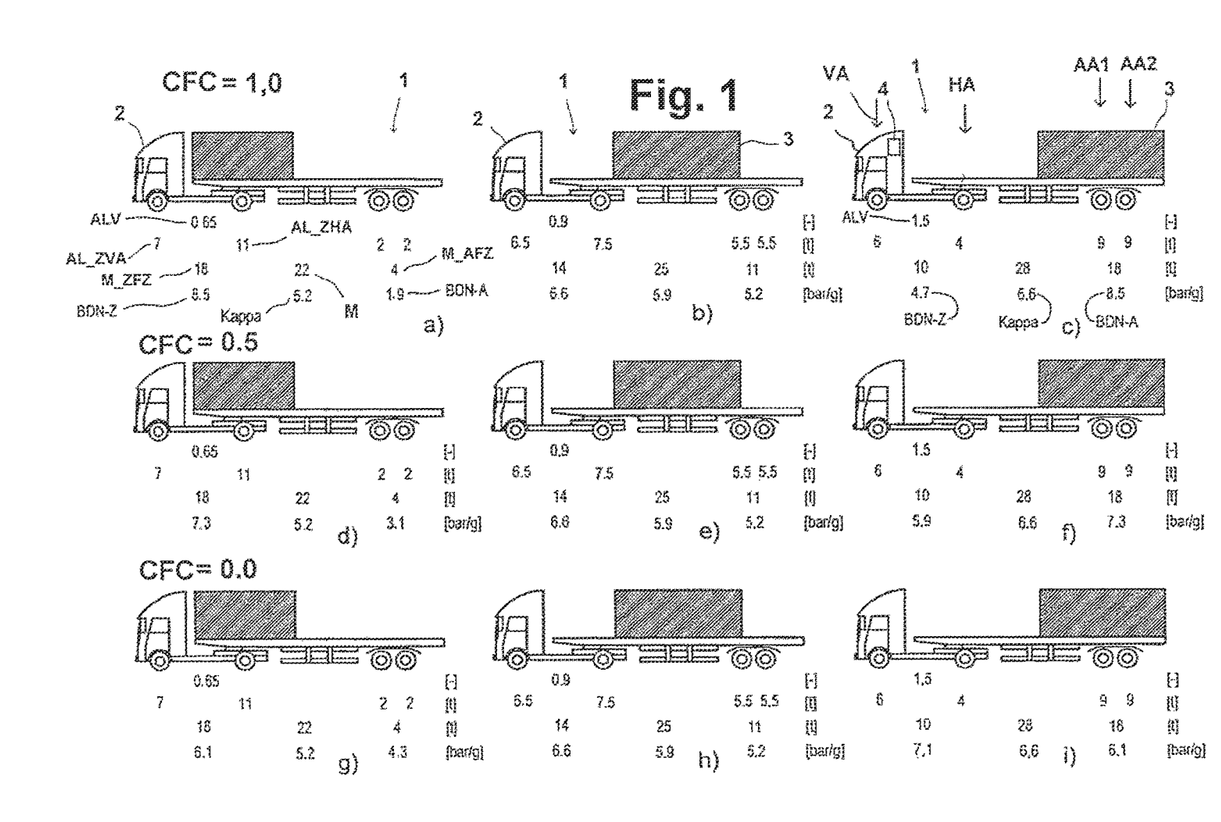
FIGS. 1a to 1i show a vehicle combination having a tractor vehicle and a trailer vehicle having two axles in different loading states upon application of three different coupling force control factors, each with specification of multiple variables, according to embodiments of the present invention.

By way of example, in FIGS. 1 (a) and (c) the tractor vehicle 2 has a from axle VA and a rear axle HA; the trailer vehicle 3 has two trailer axles AA1 and AA2; the axles HA, VA, AA1, and AA2 each have axle loads that are specified under the axles as numeric values in the unit t (tons, 1000 kg). Furthermore, in each case, the axle load distribution ALD is specified under the tractor vehicle 2—in FIG. 1 (a), therefore as ALD=0.65; to the left and right underneath that, the axle loads AL_ZVA as the axle load of the front axle of the tractor vehicle 2 and AL_ZHA as the axle load of the rear axle of the tractor vehicle 2; in the middle under these values, the weight (total loading) M_ZFZ of the tractor vehicle 2, which represents the sum of AL_ZVA and AL_ZHA; and, under this, the brake-application energy level BDN-Z of the tractor vehicle 2. Correspondingly, the respective axle load in tons is under the axles AA1 and AA2 of the trailer vehicle 3; in the middle underneath that, the weight (total loading, sum of the axle loads) M_AFZ of the trailer vehicle 3 in tons; and, under that, the brake-application energy level BDN-A of the trailer vehicle 3. In the middle under the vehicle combination 1, the mass M (total mass, total weight) of the vehicle combination 1 is indicated, which, therefore, represents the sum of all axle loads or also the sum of the two weights M_ZFZ and M_AFZ. The brake-application energy reference value Kappa is under the mass M.

The axle loads AL_ZVA, AL_ZHA, AA1, AA2, weights M_ZFZ and M_AFZ and the mass M are specified in tons, the brake-application energy levels BDN-A and BDN-Z and the brake-application energy reference value Kappa are specified in bar/g; ALD is dimensionless.

Hereinafter, reference may be made to Applicant's DE 102 61 513 A1 (especially, FIG. 5), which corresponds to U.S. Pat. No. 7,134,733, the disclosure of which is hereby incorporated by reference herein in its entirety.

Figure 6:
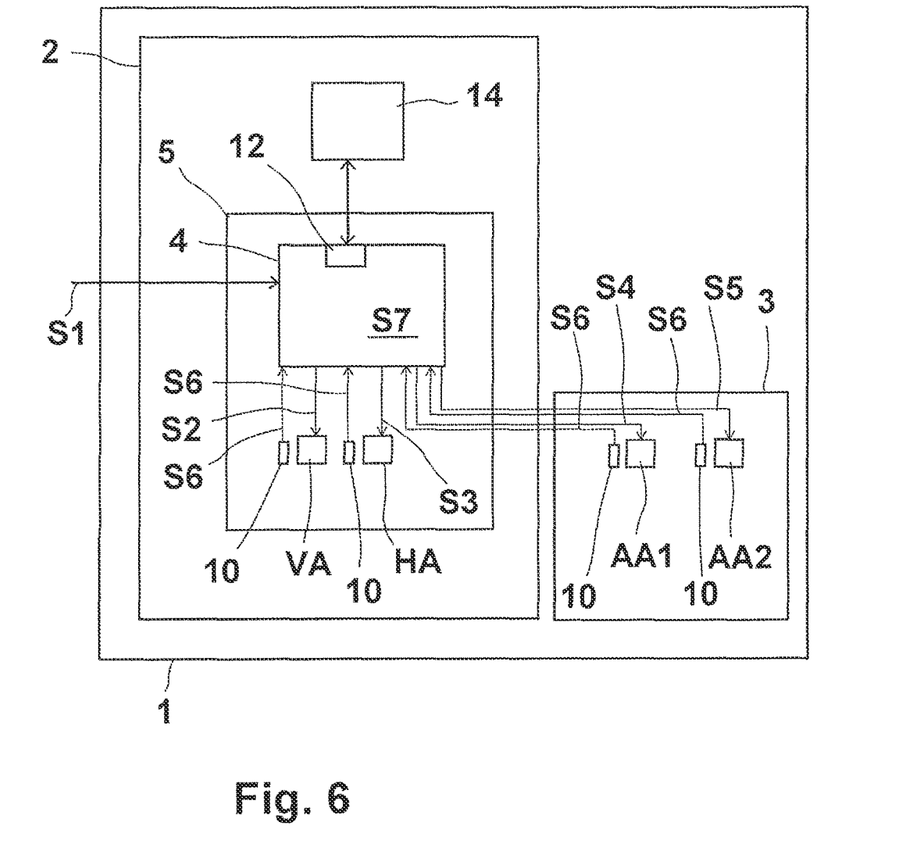
FIG. 6 is a block diagram of a vehicle combination.

As illustrated in FIG. 1(c) herein, and described in greater detail in the block diagram of FIG. 6, the tractor vehicle 2 has an EBS 5 having an BBS control unit 4, which receives a setpoint deceleration signal S1 having the setpoint deceleration specification Z-Soll and outputs brake control signals S2 to brakes of the front axle VA, brake control signals S3 to brakes of the rear axle HA, brake control signals S4 to brakes of the first trailer axle AA1, and brake control signals S5 to brakes of the second trailer axle AA2. The trailer vehicle 3 therefore does not have a separate EBS, but, rather, is also activated by the EBS control unit 4 of the tractor vehicle 2. The BBS control unit 4 ensures an ABS function, furthermore possibly also driving stability controls by asymmetrical brake actuations.

As described in DE 102 61 513 A1, for this purpose, a brake-application energy reference value Kappa is ascertained, which establishes a coupling of the brake-application energy or the setpoint brake pressures between the tractor vehicle 2 and the trailer vehicle 3. The amount in which the brake-application energy reference value Kappa is applied is established by the coupling force control factor or CFC factor CFC (coupling factor, "influence factor E"), which can be varied between 0 and 1 (0% to 100%).

The brake-application energy level BDN_Z is thus ascertained from ALD and Kappa, at CFC factor values between 0 and 99%, wherein the brake-application energy level BDN_Z is not changed if ALD does not change only at a CFC factor of precisely 100%. If ALD does not change, in the range from vehicle full to vehicle empty, the brake-application energy level BDN_Z also does not change.

A CFC factor of CFC=1.0 (100%) therefore represents a first extreme state, in which each of the two partial vehicles 2, 3 brakes itself and therefore the brake-application energy level BDN-Z of the tractor vehicle 2 is only dependent on its axle load distribution ALD, and the brake-application energy level BDN-A of the trailer vehicle 3 is dependent on the axle load distribution ALD and the brake-application energy reference value Kappa, A control target of equal adhesion ratios of the axles or wheels of the two partial vehicles 2, 3 on the roadway and, therefore, high driving stability is thus set.

A CFC factor of CFC=0.0 (0%) represents a second extreme state, in which the brake-application energy reference levels BDN-Z and BDN-A of the tractor vehicle 2 and trailer vehicle 3 are only dependent on the brake-application energy reference value Kappa. A control target having similar wear of the brakes of the tractor vehicle 2 and the trailer vehicle 3 is therefore sought.

The coupling force control factor CFC therefore represents a control factor for the coupling force or coupling work and determines the ratio of braking work to be applied between the tractor vehicle 2 and the trailer vehicle 3.

Characteristic maps 15 (characteristic diagrams, characteristics) are stored in the EBS control unit 4 itself or, according to FIG. 6, in an external memory 14, which the EBS control unit 4 accesses via an interface 12.

In FIG. 1, situations having a loading entirely at the front are shown in each of the left FIGS. (*a*), (*d*), (*g*); situations having a middle loading are shown in each of the middle FIGS. (*b*), (*e*), (*h*); situations having a loading entirely at the rear are shown in each of the right FIGS. (*c*), (*f*), (*i*).

In the top line, a coupling force control factor CFC=1.0 is shown, in the middle line a coupling force control factor of CFC=0.5 is shown, and in the bottom line a coupling force control factor of CFC=0.0 is shown.

Figure 2:
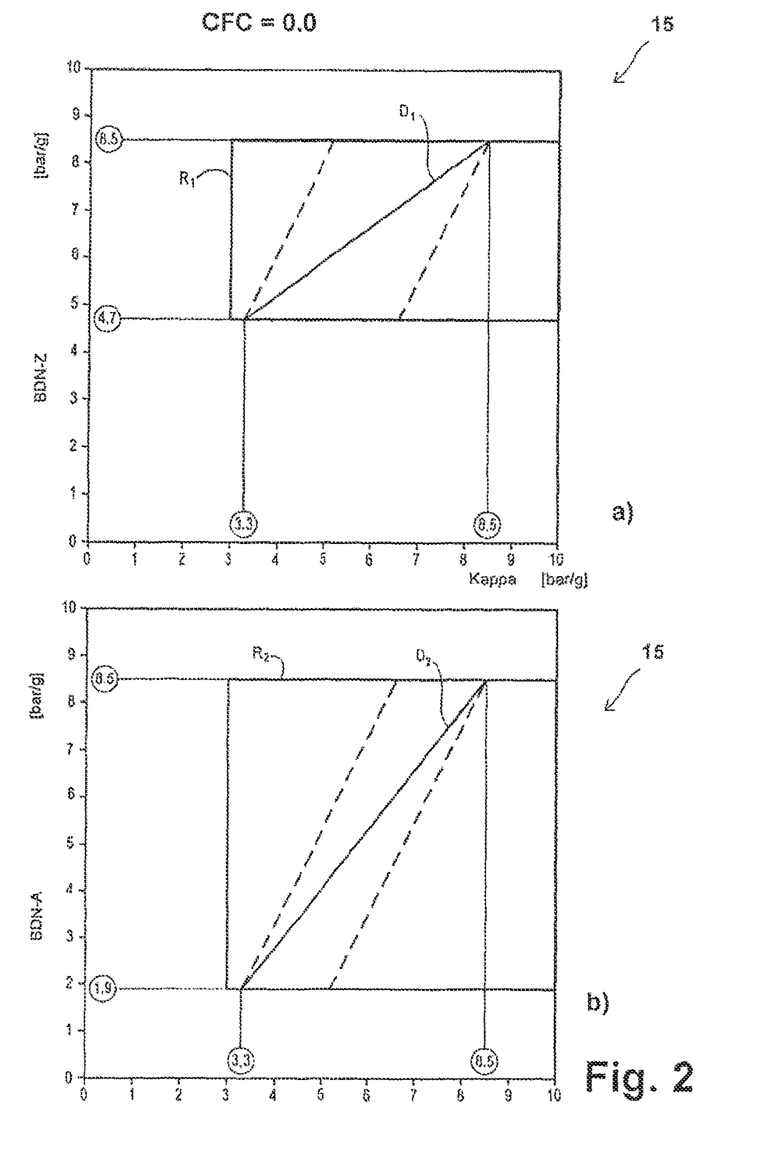
FIG. 2 are characteristic maps illustrating the dependence of the brake-application energy level of the tractor vehicle and of the trailer vehicle on the brake-application energy reference value Kappa and on the axle load distribution ALD upon application of a coupling force control factor (CFC factor) of zero and therefore possible coupling force between the partial vehicles of the vehicle combination.
Figure 3:
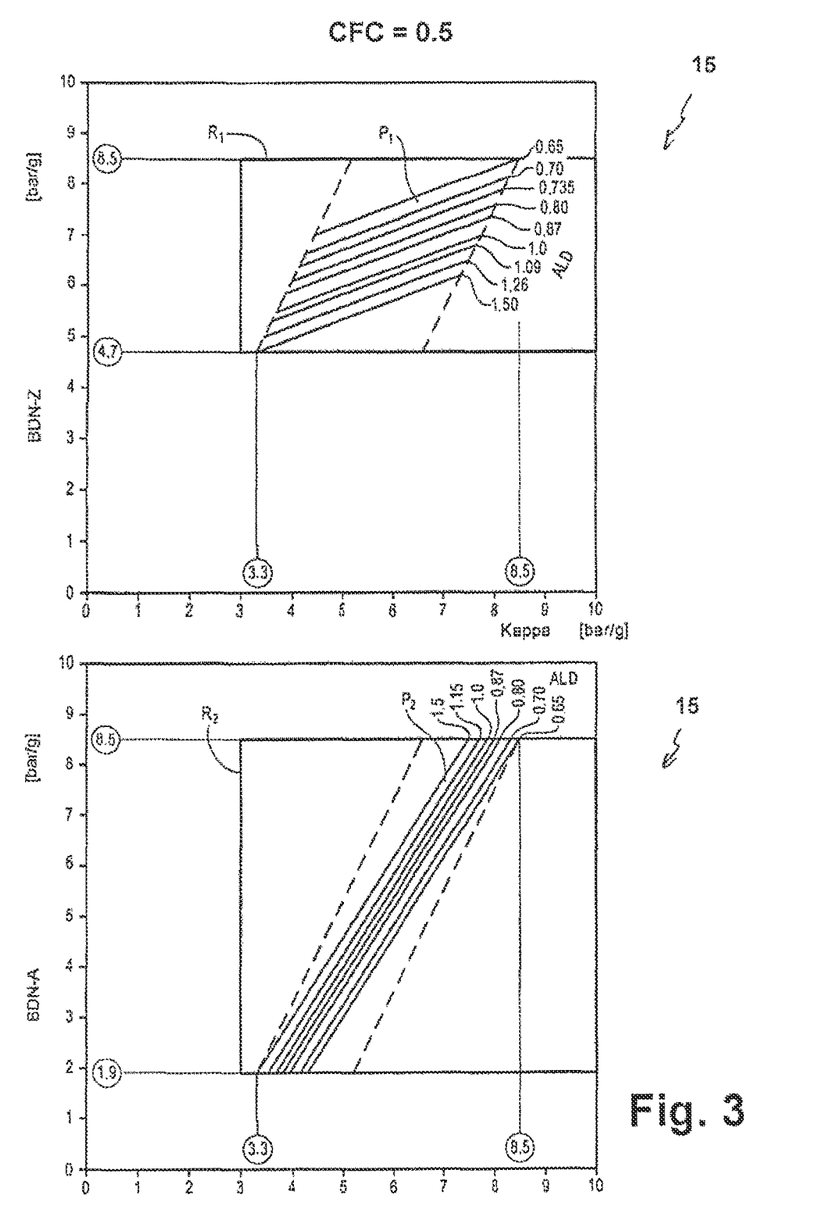
FIG. 3 illustrates the dependence of the brake-application energy level of the tractor vehicle and of the trailer vehicle on the brake-application energy reference value and on the axle load distribution upon application of a mean coupling force control factor of 0.5.
Figure 4:
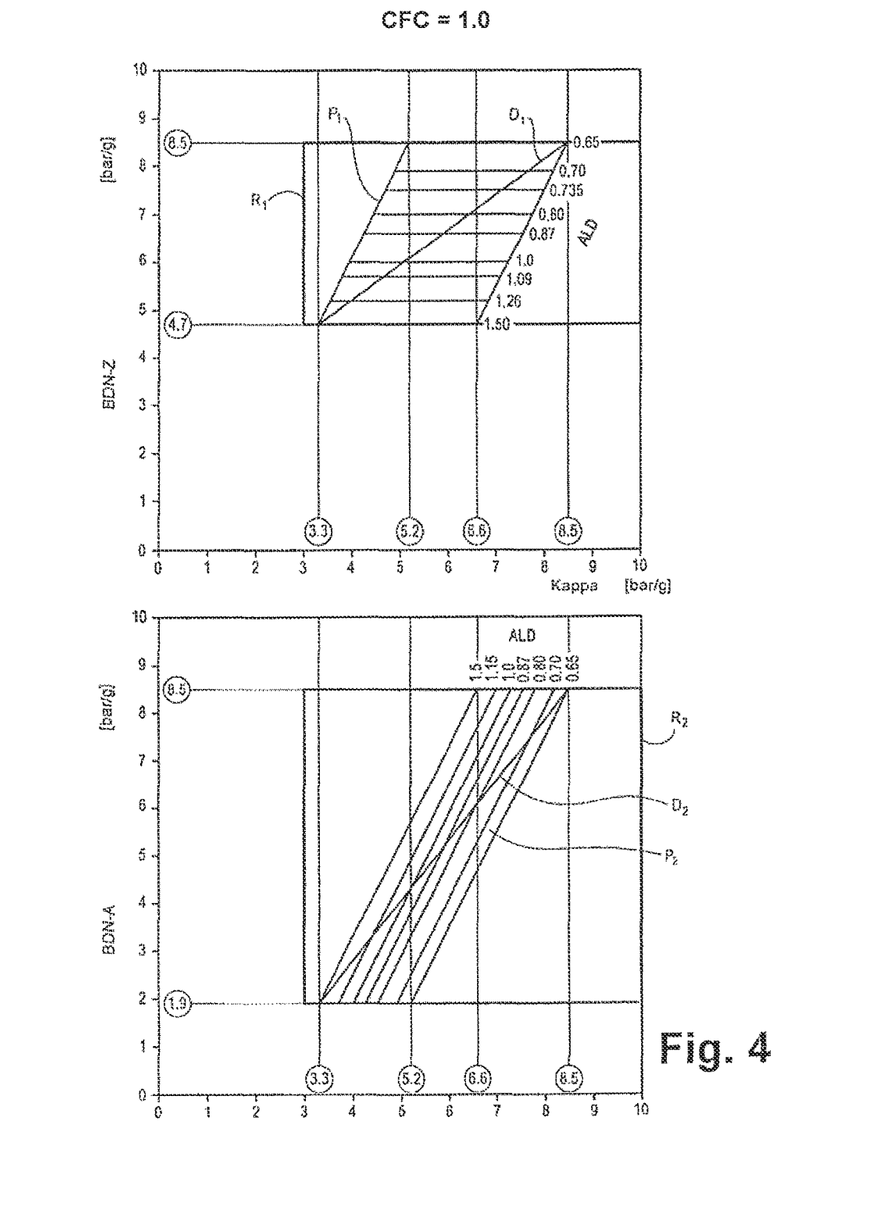
FIG. 4 illustrates the dependence of the brake-application energy level of the tractor vehicle and of the trailer vehicle on the brake-application energy reference value and on the axle load distribution upon application of a coupling force control factor of 1.0, i.e., separate braking of each partial vehicle and therefore desired zero coupling force control target of a coupling force between the partial vehicles of the vehicle combination.

Further, FIGS. 2 and 3, which are used for illustration purposes, correspond to characteristic diagrams of DE 102 61 513 A1.

An extreme case of a loading situation, in which the inventive method is particularly relevant, is shown in FIG. 1 (*i*), i.e., on the bottom right, having low coupling force control factor CFC=0 and extreme loading at the rear, i.e., on the trailer axles AA1 and AA2. The result according to conventional brake control according to DE 102 61 513 A1 is that, here, a very large coupling force occurs between the partial vehicles, i.e., between the tractor vehicle 2 and the trailer vehicle 3. It follows from this, however, that, during braking, the trailer vehicle 3, i.e., the trailer, presses on the tractor vehicle 2.

This is shown by a corresponding calculation: according to FIG. 1 (*i*), the tractor vehicle 2 over-brakes in the same manner as the brake-application energy levels BDN_Z behave to one another, i.e., in the ratio of 7.1 bar/g of FIG. 1 (*i*) to the corresponding value in the case of CFC=1, i.e., the value of FIG. 1 (*c*) of 4.7 bar/g; therefore the tractor vehicle 2 over-brakes by 7.1/4.7, i.e., by more than 50%.

Correspondingly, under-braking of the trailer (trailer vehicle 3) occurs. The trailer vehicle 3 under-brakes corresponding to the ratio of the brake-application energy levels (setpoint brake pressures) BDN_A of FIG. 1 (*i*) and FIG. 1 (*c*) (coupling force control factor 0 and 1), i.e., in the ratio of 6.1 bar/g to 8.5 bar/g, i.e., by 6.1/8.5, i.e., by approximately 30%.

From the over-braking of the tractor vehicle 2 and the under-braking of the trailer vehicle 3, a shifting coupling force of up to 10 t results. In the case of the specified total axle loads, which are each set equal in the individual columns in this diagram as a function of the loading situation, a shifting coupling force therefore results of approximately 0.5*10 t+(1.0−0.7)*18 t=5 t+5 t=10 t.

This shifting force represents a potentially hazardous situation. That is, there is a danger that the vehicle combination will buckle (jackknife) by force action from the rear.

In FIG. 1(*g*), i.e., strongly front-loaded loading with low CFC or even CFC=0, the trailer vehicle 3, i.e., the semitrailer, is over-braked and the tractor vehicle 2 is under-braked. The wheels of the trailer vehicle 3 lock up relatively early, in particular, in the case of low coefficients of friction of tires to roadway and, in particular, during cornering.

According to this embodiment, a status signal S7, which represents the status of the EBS of the tractor vehicle 2 itself, is analyzed. The status signal S7 signals whether the EBS system 5 of the tractor vehicle 2 is functional; the functional capability can be absent if the EBS control unit 4 itself is defective and/or the contact with, for example, sensor signals of the ABS sensors or the control line to output the brake control signals of S2, S3, S4, S5 are faulty.

Therefore, if the EBS control unit 4 recognizes its absent functional capability or an absent functional capability of the EBS system 5, the coupling force control factor is always set to a high value, i.e., at least to a value CFC_min; this can be set in this case for high security to CFC_min=1.0, i.e., in the event of a lack of functional capability, CFC factor=1.0 is always set. Even if a smaller coupling force control factor is set and a very large ALD value, for example, 1.5 or a very small ALD value, for example, 0.65 has been ascertained, nonetheless CFC factor=1 is selected.

In this way, a coupling force is no longer active and both partial vehicles 2, 3 are braked separately. Therefore, critical driving states of the vehicle combination no longer occur.

Higher CFC values are set for the critical situations, in particular upon recognition of the failure of the tractor vehicle EBS or the tractor vehicle EBS control unit 4.

According to FIG. 6, the tractor vehicle 2 has on its front axle VA and on its rear axle HA on each wheel ABS sensors (wheel speed sensors) 10 in each case, which output wheel speed signals S6 to the EBS control, unit 4. The EBS control unit 4 can optionally also record signals from axle load sensors, if such sensors are provided; the inventive method can also be carried out without such axle load sensors; for this purpose, reference is made in particular to DE 102 61 513 A1 for the estimation of the axle load and axle load distributions.

Figure 5:
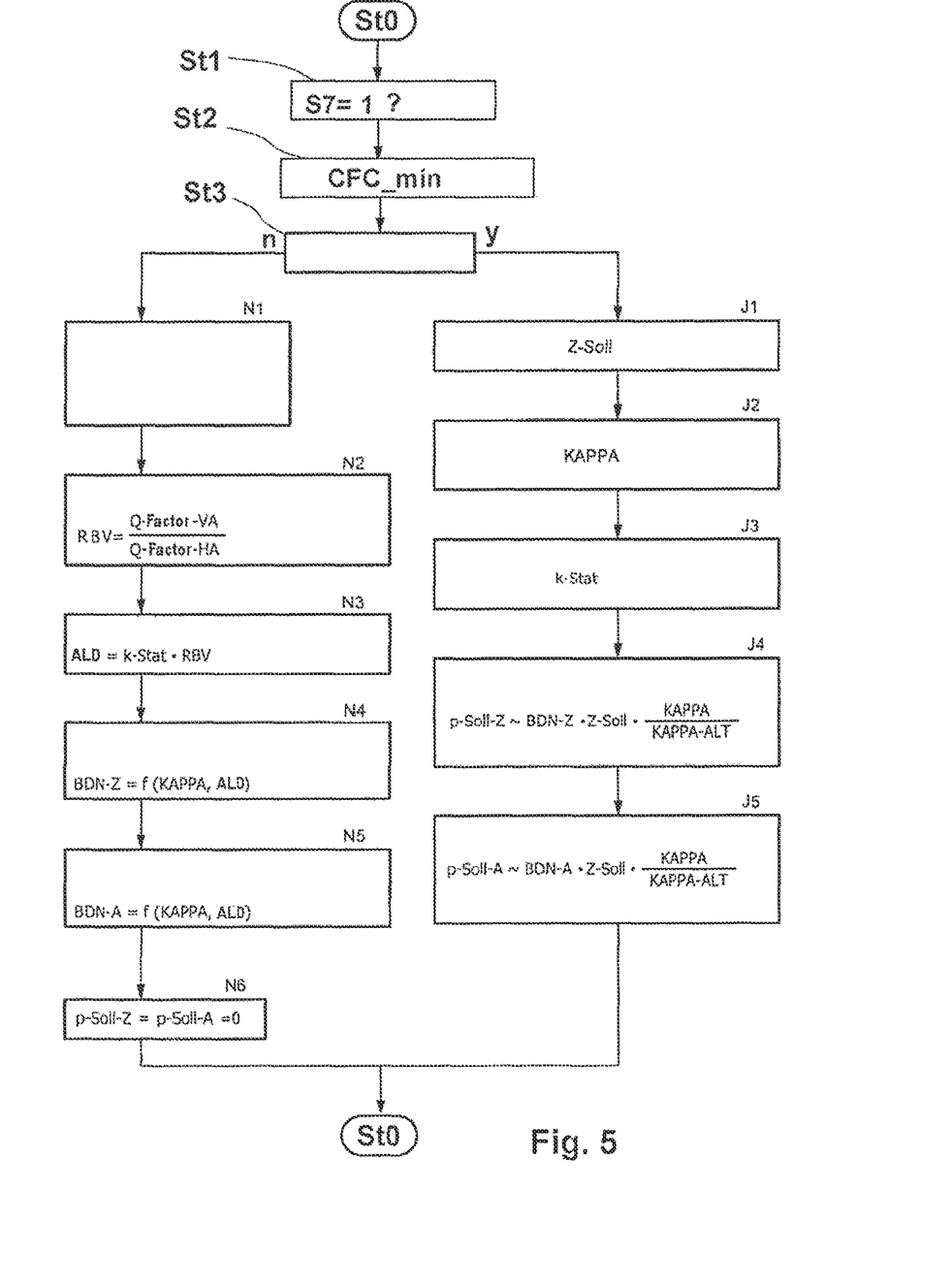
FIG. 5 is a flow chart illustrating a brake application energy control method according to an embodiment of the present invention.

Referring now to FIG. 5, in step St0 at the start, for example, an actuation of the vehicle ignition, or the startup of the engine is effected. Subsequently, in step St1, the functional capability of the EBS system 5 is judged by the EBS control unit 4 itself, and the status signal S7 is set in accordance with the functional capability, i.e., as a binary signal having the value 1 or 0. From this, in step St2, the value of CFC_min is set, for example, in the ease of fault-free EBS system 5 and therefore S7=1, as CFC_min=0 and, upon recognition of relevant faults and therefore S7=0, to CFC_min=1.

The EBS control unit 4 can therefore subsequently consider the value CFC_min in the selection of tire characteristics 15 and the loading state of the tractor vehicle, i.e., the axle load distribution ALD, in the respective characteristics.

Subsequently, steps St3 and N1 to N6 and J1 to J5 according to FIG. 1 of DE 102 61 513 A1 are carried out, wherein, in the alterations thereto in steps N4 and N5, the selection of the coupling force control factor CFC is as a function of CFC_min, d.h. CFC≥CFC_min.

If S7=0, CFC_min=1 can always be set; however, graduations can also be performed, for example, in the event of fundamental functional capability, since all ABS signals (wheel speed signals) S6 are recognized, but a tendency toward instabilities occurs as a result of high wind strength, for example, or also instabilities are recognized, without being able to be assigned, the value CFC_min=0.5 or CFC_min=0.75 can be set.

Examples of graduations:
S7=0==>CFC_min=1 (or somewhat less)
One ABS wheel sensor defective on one axle==>CFC_min=0.3
One ABS wheel sensor defective on each of VA and HA==>CFC_min=0.5
Recognized steep hill descent==>$CFC_{min}$=0.5
Presently knowing that the roadway has a low coefficient of friction==>CFC_min=0.5
It is raining==>0.3
It is snowing==>0.5
Black ice warning via GPS or freeway overpass transmitters==>0.5

It will thus be seen that the objects set forth above, among those made apparent from the preceding description, are efficiently attained, and since certain changes may be made without departing from the spirit and scope of the invention, it is intended that ail matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for controlling the brake-application energy of a vehicle combination having a tractor vehicle equipped with an electronically controlled brake system, at least one front axle and one rear axle, and a trailer vehicle having at least one trailer axle, the method comprising; in the event of a brake actuation, determining a deceleration setpoint value; comparing the deceleration setpoint value to an actual deceleration value to obtain a current brake-application energy reference value; determining brake-application energy setpoint values for the tractor vehicle and for the trailer vehicle from the deceleration setpoint value, the current brake-application energy reference value, a brake-application energy level for the tractor vehicle and a brake-application energy level for the trailer vehicle using stored characteristic maps showing dependencies of the brake-application energy levels of the tractor vehicle and the trailer vehicle on at least one of the brake-application energy reference value and on an axle load distribution of the tractor vehicle, the characteristic maps being selected as a function of a pre-definable coupling force control factor establishing a distribution of braking work between the tractor vehicle and the trailer vehicle; monitoring functional capability of the electronically controlled brake system of the tractor vehicle resulting in a status signal; and setting a coupling force control factor as a function of the status signal such that, when the functional capability of the electronically controlled brake system of the tractor vehicle is one of absent and impaired, a minimal coupling force control factor is set, and the coupling force control factor is set one of greater than and equal to the minimal coupling force control factor, and wherein the minimal coupling force control factor is not equal to zero.

2. The method as claimed in claim 1, wherein the minimal coupling force control factor is set such that the brake-application energy levels for the tractor vehicle and the trailer vehicle are dependent on the brake-application energy reference value and on the axle load distribution.

3. The method as claimed in claim 1, wherein, based on the functional capability of the electronically controlled brake system, a differentiation is made between only a completely functional electronically controlled brake system and a faulty electronically controlled brake system.

4. The method as claimed in claim 1, wherein the minimal coupling force control factor is a function of an axle load distribution of the axle load of the front axle with respect to the axle load of the rear axle, and wherein with increasing higher relative loading of the rear axle, the minimal coupling force control factor is elevated.

5. The method as claimed in claim 1, wherein, when the electronically controlled brake system is non-functional, the coupling force control factor is set to 1.0.

6. The method as claimed in claim 1, wherein monitoring the functional capability of the electronically controlled brake system includes determining whether a control unit of the electronically controlled brake system records wheel speed signals.

7. The method as claimed in claim 1, wherein monitoring the functional capability of the electronically controlled brake system includes determining whether brake control signals output by a control unit of the electronically controlled brake system are received by at least one of wheel brakes of the vehicle combination and anti-lock brake system valves of the wheel brakes.

8. An electronically controlled brake system control unit for a tractor vehicle of a vehicle combination including a trailer vehicle, the electronically controlled brake system control unit being configured to record a brake command signal and wheel speed signals associated with at least one front axle and one rear axle of the tractor vehicle and to output brake control signals to wheel brakes, the electronically controlled brake system control unit comprising at least one of (i) internal memory and (ii) external memory connected to the electronically controlled brake system control unit via a signal interface, for storing dependencies of brake-application energy levels of the tractor and trailer vehicles on at least one of a brake-application energy reference value and on an axle load distribution, wherein the electronically controlled brake system control unit is further configured to, in the event of a brake actuation:

determine a deceleration setpoint value;

compare the deceleration setpoint value to an actual deceleration value to obtain a current brake-application energy reference value;

determine brake-application energy setpoint values for the tractor vehicle and for the trailer vehicle from the deceleration setpoint value, the current brake-application energy reference value, the brake-application energy level for the tractor vehicle and the brake-application energy level for the trailer vehicle using stored characteristic maps showing dependencies of the brake-application energy levels of the tractor vehicle and the trailer vehicle on at least one of the current brake-application energy reference value and on the axle load distribution of the tractor vehicle, the characteristic maps being selected as a function of a pre-definable coupling force control factor establishing a distribution of braking work between the tractor vehicle and the trailer vehicle;

monitor functional capability of an electronically controlled brake system of the tractor vehicle resulting in a status signal; and set a coupling force control factor as a function of the status signal such that, when the functional capability of the electronically controlled brake system of the tractor vehicle is one of absent and impaired, a minimal coupling force control factor is set, and the coupling force control factor is set one of greater than and equal to the minimal coupling force control factor, wherein the minimal coupling force control factor is not equal to zero.

9. A vehicle combination, comprising a tractor vehicle and a trailer vehicle, the tractor vehicle including an electronically controlled brake system control unit configured to record a brake command signal and wheel speed signals associated with at least one front axle and one rear axle of the tractor vehicle and to output brake control signals to wheel brakes, the electronically controlled brake system control unit comprising at least one of (i) internal memory and (ii) external memory connected to the electronically controlled brake system control unit via a signal interface, for storing dependencies of brake-application energy levels of the tractor and trailer vehicles on at least one of a brake-application energy reference value and on an axle load distribution, wherein the electronically controlled brake system control unit is further configured to, in the event of a brake actuation:

determine a deceleration setpoint value;

compare the deceleration setpoint value to an actual deceleration value to obtain a current brake-application energy reference value;

determine brake-application energy setpoint values for the tractor vehicle and for the trailer vehicle from the deceleration setpoint value, the current brake-application energy reference value, the brake-application energy level for the tractor vehicle and the brake-application energy level for the trailer vehicle using stored characteristic maps showing dependencies of the brake-application energy levels of the tractor vehicle and the trailer vehicle on at least one of the current brake-application energy reference value and on the axle load distribution of the tractor vehicle, the characteristic maps being selected as a function of a pre-definable coupling force control factor establishing a distribution of braking work between the tractor vehicle and the trailer vehicle;

monitor functional capability of an electronically controlled brake system of the tractor vehicle resulting in a status signal; and set a coupling force control factor as a function of the status signal such that, when the functional capability of the electronically controlled brake system of the tractor vehicle is one of absent and impaired, a minimal coupling force control factor is set, and the coupling force control factor is set one of greater than and equal to the minimal coupling force control factor, wherein the minimal coupling force control factor is not equal to zero.

10. The vehicle combination as claimed in claim 9, wherein the trailer vehicle at least one of (i) does not have an electronically controlled brake system control unit, and (ii) has an electronically controlled brake system control unit without separate automatic load-dependent brake force control functionality.

\* \* \* \* \*